United States Patent [19]

Schartzman

[11] Patent Number: 4,640,653
[45] Date of Patent: Feb. 3, 1987

[54] INTEGRAL SPRING FLEXURE FOR USE WITH HIGH SPEED ROTATING SHAFTS

[76] Inventor: Everett H. Schartzman, 2751 Toledo St., #309, Torrance, Calif. 90503

[21] Appl. No.: 635,716

[22] Filed: Jul. 30, 1984

[51] Int. Cl.$^4$ .............................................. B23Q 3/12
[52] U.S. Cl. ................................ 409/233; 408/239 R
[58] Field of Search ............ 279/1 TS; 409/231, 233; 408/239 R

[56] References Cited

U.S. PATENT DOCUMENTS

| | | | |
|---|---|---|---|
| 3,052,011 | 9/1962 | Brainard et al. | 279/1 TS |
| 3,490,333 | 1/1970 | Scruton | 409/233 |
| 4,172,683 | 10/1979 | Shimajiri et al. | 409/233 |
| 4,411,568 | 10/1983 | Rohm | 409/233 |

FOREIGN PATENT DOCUMENTS

| | | | |
|---|---|---|---|
| 45784 | 4/1977 | Japan | 409/233 |
| 61438 | 4/1982 | Japan | 409/233 |
| 719816 | 3/1980 | U.S.S.R. | 409/233 |

Primary Examiner—Gil Weidenfeld
Assistant Examiner—Daniel W. Howell
Attorney, Agent, or Firm—Beehler, Pavitt, Siegemund, Jagger, Martella & Dawes

[57] ABSTRACT

This invention relates to high speed spindles employing a tool holding mechanism which rotates with the spindle. In machining applications utilizing high speed spindles which operate above 20,000 RPM, it is desired to manufacture such spindles so that they maintain their balance. Spindles which employ tool holding mechanisms are required to grasp and release tools between machining operations. Such mechanisms usually employ springs for either holding tools in a collect or returning the release mechanism. This invention discloses two types of springs which are true flexures and are held integral with the spindle shaft. The nature of the design is such that it affords the minimal amount of structural position deviation after each actuation for tool changes, thus minimizing out-of-balance conditions.

10 Claims, 7 Drawing Figures

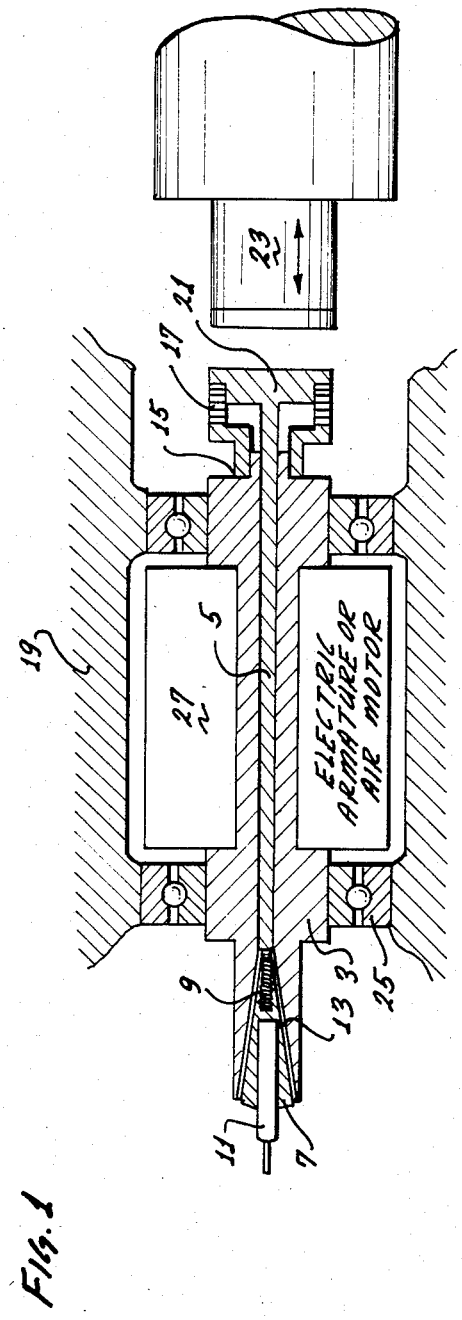
FIG.1
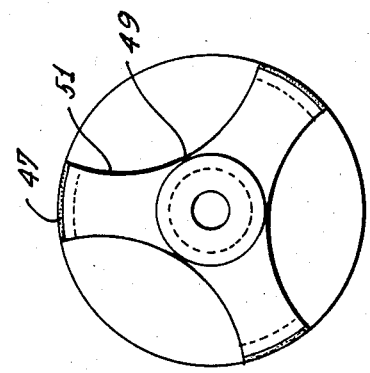
FIG.3B (SECTION A-A OF FIG.3)
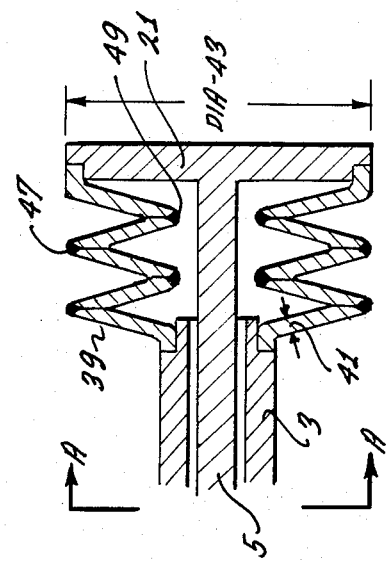
FIG.3 (METAL DIAPHRAGM)

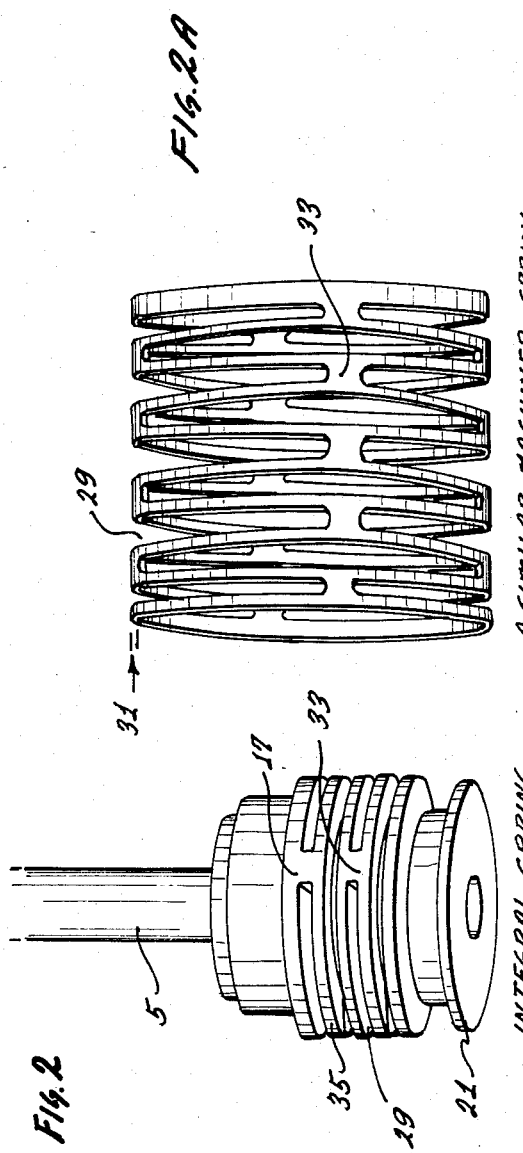
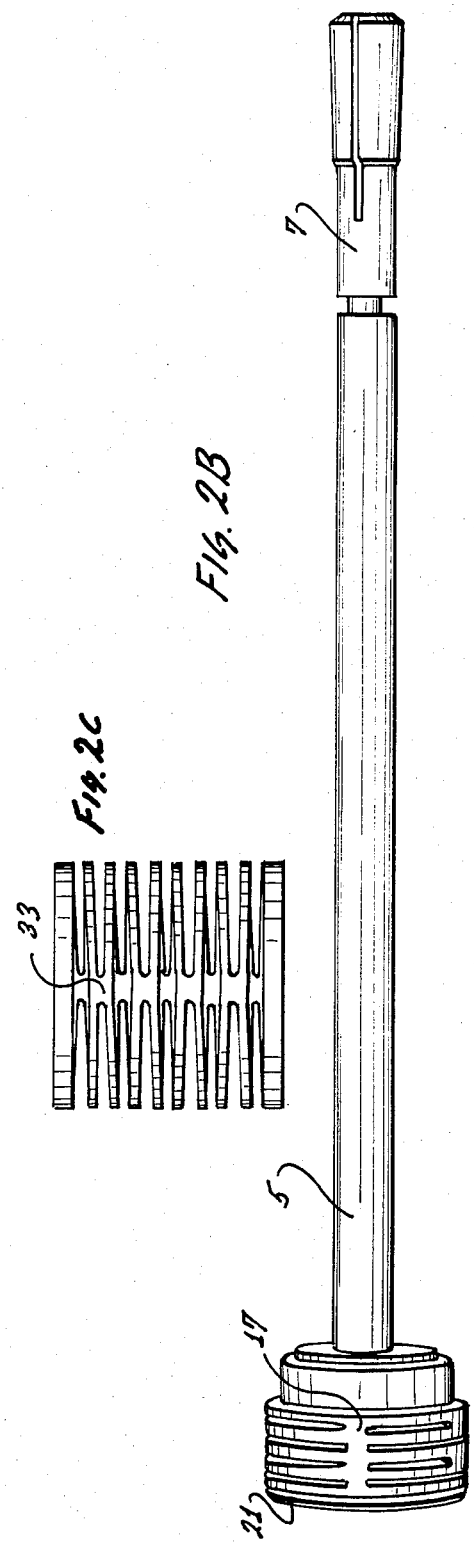

INTEGRAL SPRING FLEXURE FOR USE WITH HIGH SPEED ROTATING SHAFTS

BACKGROUND OF THE INVENTION

Flexures are used to connect two members of a system between which a relatively small movement is required. This method of construction has a great advantage of simplicity, coupled with complete freedom from friction and backlash, which are very detrimental to the performance of said system.

The great advantage of the flexure lies in the absence of sliding parts. Consequently, there is no need of lubrication. Neither friction nor wear occur, and dirt, if any, does not cause trouble.

The use of an arrangement in which the shaft, drawbar and restoring spring are essentially one, minimizes any relative positional change during and after operation.

In recent years, with the development of computer controlled numeric machines, a great need has arisen for very accurate spindles for use in drilling, milling, grinding, dicing, and other machining-type operations. With the greater use of new types of cutting materials such as tungsten carbide, aluminum oxide, and other ceramics which are now being utilized in cutting tools, increasingly higher speeds are desired. However, most, if not all of these new materials are brittle, and therefore it is desirable to minimize any shock associated with high speed rotating cutting tools.

The desirability of obtaining the lowest possible tool shock and high accuracy dictates a spindle design which obtains and maintains an accurate axis of rotation which does not deviate during operation. Low spindle vibration is also desirable for the same reasons.

Further details of these and other novel features of the invention including, for example, its structural and method cooperation with the other system embodiments, as well as additional objects and advantages of the invention and their principles of operation will become apparent and be best understood from a consideration of the following description, when taken in connection with the accompanying drawing, which is presented by way of an illustrative example only.

BRIEF DESCRIPTION OF THE DRAWINGS

FIG. 1 is a cross-sectional drawing showing the structural relationships of the major components in accordance with the principles of the present invention;

FIG. 2 is an illustrative view showing the construction of said integral spring;

FIG. 2A is a view in perspective of an integral spring in accordance with the present invention in which the slots are radiused;

FIG. 2B is an illustrative view showing the spring nut in relationship to the drawbar and collet assembly;

FIG. 2C is a view in perspective of a form of integral spring in accordance with this invention;

FIG. 3 is a cross-sectional view showing the design and construction of an alternate method of design of said integral spring; and FIG. 3B shows the view A—A of FIG. 3.

DETAILED DESCRIPTION OF THE INVENTION

Most of the mechanisms that rotate with said spindles use springs to either bias or retain pressure or force for holding the tools by means of collets, chucks, or other such devices.

A major advantage of this spindle design is that all of the individual parts return to their respective positions with a minimum of deviation after each actuation, so as to prevent or minimize the occurrence of out-of-balance forces.

The type of spring best suited for this application is one that is of the integral machine type as shown in FIG. 2. This type of spring can not only be designed to have the desired or required spring characterists, but is also a true flexure integral with the assembly. It therefore minimizes any geometric change, and prevents out-of-balance forces due to the shifting of the part's position.

Another type of spring which also meets the above requirements is of the metal bellows type as shown in FIG. 3. This type of construction also provides a true flexuring device, thus again minimizing any geometric change from its original position after actuation.

FIG. 1 shows such a spindle design in which the shaft 3 is hollow so as to allow for the use of a drawbar 5. Said drawbar 5 is attached to collet 7 by means of threads 9. Collet 7 is contracted around tool 11 by means of its tapered surface 13 and corresponding tapered surface in shaft 3. Drawbar 5 is kept in tension by integral machine type spring 17 located at the opposite end of shaft 3. Spring 17 is constrained by shaft 3 at point 15 on one end, and head 21 of drawbar 5 at its other end. Drawbar 5 is actuated by force applied to its head 21, which is supplied by any means, located at point 23, such a pneumatic, hydraulic, magnetic, or electrical/electro-mechanical. Shaft 3 is maintained in a true concentric position relative to housing 19 by a bearing system 25. Shaft 3 is powered by any desired means 27, such as an electric motor, pneumatic motor, hydraulic motor, or various types of turbines. The spring rotates with the shaft 3 and may be attached at 15 by keys, splines, screw threads, or by virtue of the spring biased engagement between the spring and the shaft.

As can also be seen in FIG. 1, a drawbar system is utilized to actuate the collet or chuck. An integral spring nut assembly is used to close the chuck and maintain the required force to hold the tool bit in the collet or chuck. The spring nut is machined with slots to generate the required geometry for creating the spring and is made in one piece. The one piece construction minimizes moving parts and eliminates the movement of any of the rotating parts relative to each other. This feature assures that no out-of-balance condition, nor shifting of the true mass axis with the geometric axis will occur during operation. This feature maintains the best concentricity and insures a minimum of vibration during operation.

FIG. 2, 2A, 2B and 2C show that the construction of the integral spring nut 17 is obtained by machining alternate layers of slots 29 partially through a tubular cross section 31. Lands 33 of each alternate layer are disposed 90 degrees apart so as to maintain the integrity of said spring. The thickness of each spring member 35 and wall thickness of the tubular cross section 31 determine the stiffness and stress level of each spring member 35. The number of slots 29 or number of spring members 35 in conjunction with the thickness and diameter of the tubular cross section determine the spring stiffness. The desired spring characteristics can thus be obtained to hold collet 7 around tool 11 within shaft 3 by the force applied by said spring nut 17.

FIG. 3 shows an alternate integral spring nut design which is comprised of metal diaphragms 39. Said diaphragm's thickness 41 and diameter 43 determine the stress levels and force load characteristics. The number of said diaphragms 39 also determines the overall spring stiffness. Each diaphragm can be separately manufactured and joined by welding, brazing, or any other suitable means at their respective outer circumference 47 and inner circumference 49.

FIG. 3B shows another alternative to the design of the type of integral spring nut as described in FIG. 3. Here, notches 51 are utilized to decrease the spring stiffness and minimize stress in said diaphragms 39. The inner circumference 49 is still completely welded or joined as described in FIG. 3. The outer circumference 47 is now only joined with each alternate diaphragm between each notch as shown.

It is also possible to manufacture this type of spring nut flexure in one piece by hydraulically forming or die rolling a tube on a mandrel.

There have thus been disclosed and described various structural means and examples of a new spring nut flexure for use in high-speed rotating shafts which achieve the objects and exhibit the advantages set forth herein and above.

The embodiments of the invention in which an exclusive property or privilege is claimed are defined as follows.

I claim:

1. A high speed spindle having an accurate axis of rotation which does not deviate during operation thereof comprising:
   a housing;
   a spindle shaft positioned in said housing;
   bearing means positioned within said housing a supporting said spindle shaft for rotation;
   rotatable collet means cooperating with said rotatable spindle shaft for releasably holding a tool member,
   said spindle shaft including rotatable drawbar means movable axially relative to said spindle to effect release of said collet means in one position and engagement in another position;
   rotatable non-helical spring means cooperating with said drawbar means to bias the latter in the engaged position of said collet means,
   said non-helical spring means being positioned in concentric relation to said drawbar means,
   means interconnecting said non-helical spring means and said drawbar means, and
   said non-helical spring means being an integral one-piece spring member including a plurality of spring elements integrally jointed together in which each spring element includes spaced upper and lower surfaces and being of a predetermined thickness and of a diameter which determines the stiffness and the stress level of each spring element in order to inhibit out-of-balance shifting of the true mass of the spring member with respect to the geometric axis of said spring member during rotation of said spindle assembly at high speeds.

2. A high speed spindle assembly as set forth in claim 1 wherein said non-helical spring means is a machined spring.

3. A high speed spindle assembly as set forth in claim 1 wherein said non-helical spring means is compressed to effect release of said collet.

4. A high speed spindle assembly as set forth in claim 1 wherein said non-helical spring means is a fabricated bellows type of spring.

5. A high speed spindle assembly as set forth in claim 1 in which said collet includes a tapered tool chuck received in a tapered aperture provided in the end of said spindle shaft.

6. A high speed spindle assembly as set forth in claim 5 wherein one end of said drawbar means is affixed to said tapered tool chuck.

7. A high speed spindle assembly as set forth in claim 6 wherein said spindle shaft is hollow for reception of said drawbar means.

8. A high speed spindle assembly as set forth in claim 1 wherein said non-helical spring means is a machined spring and includes a nut member integrally joined with said non-helical spring means to form an integral non-helical spring and nut assembly, and
   said integral non-helical spring and nut assembly being connected to said drawbar means to effect axial movement thereof.

9. A high speed spindle assembly as set forth in claim 7 wherein said non-helical spring means is a machined metal spring having a plurality of spaced slots and a plurality of spaced lands.

10. A high speed spindle assembly as set forth in claim 1 wherein said non-helical spring means bears against a portion of one end of said spindle shaft to bias said collet into the engaged position.

* * * * *